July 17, 1923.  1,461,887
O. W. BIRHANZL
FLEXIBLE GUARD FOR MACHINE TOOLS
Filed Aug. 20, 1921
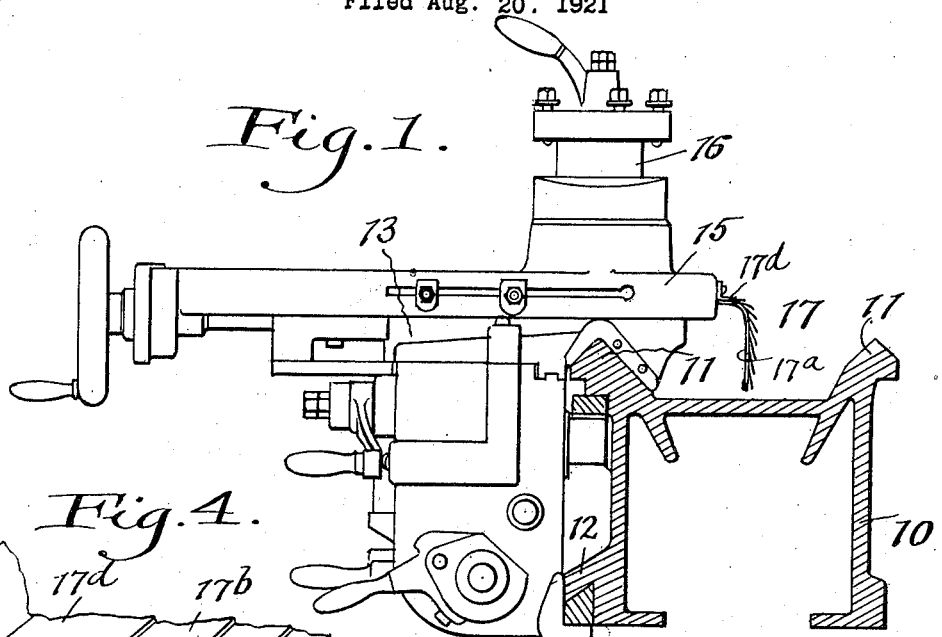
Fig. 1.
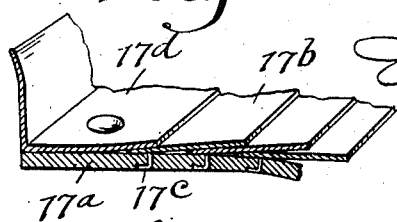
Fig. 4.
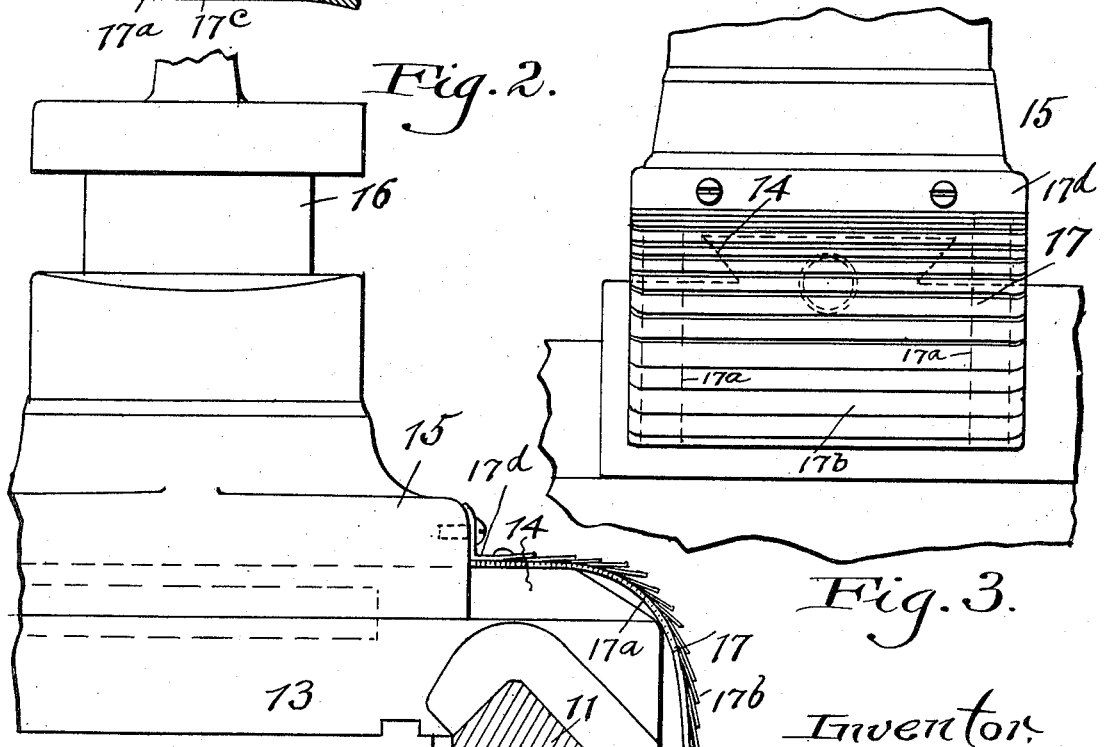
Fig. 2.
Fig. 3.
Inventor
Otto W. Birhanzl
by
Thurston Kwit Hudson
attys.

Patented July 17, 1923.

UNITED STATES PATENT OFFICE.

OTTO W. BIRHANZL, OF CLEVELAND, OHIO, ASSIGNOR TO THE WARNER AND SWASEY COMPANY, OF CLEVELAND, OHIO, A CORPORATION OF OHIO.

FLEXIBLE GUARD FOR MACHINE TOOLS.

Application filed August 20, 1921. Serial No. 493,789.

To all whom it may concern:

Be it known that I, OTTO W. BIRHANZL, a citizen of the United States, residing at Cleveland, in the county of Cuyahoga and State of Ohio, have invented a certain new and useful Improvement in Flexible Guards for Machine Tools, of which the following is a full, clear, and exact description.

This invention relates to machine tools, and particularly to turret lathes having a cross slide mounted to travel back and forth on ways of a side carriage.

The principal object of the invention is to provide means for protecting the ways when the latter are exposed and the slide is drawn back, and more particularly it is the aim of the invention to provide means for preventing chips, cutting compounds, and the like from dropping onto the ways or working into the carriage when the ways are exposed as the slide is drawn back.

The above object is attained very effectively by the provision of a guard, preferably attached to the slide so as to move with the slide as the latter is shifted, and thus extend over the ways and the portion of the carriage which would otherwise be exposed as the slide is drawn back. Preferably the guard is of a flexible nature, so that when the slide is moved inward it will drop out of the way and will not interfere with the work.

The invention may be further briefly summarized as consisting in certain novel details of construction and combinations and arrangements of parts which will be described in the specification and set forth in the appended claims.

In the accompanying sheet of drawings wherein the preferred embodiment of the invention is shown, Fig. 1 is a transverse sectional view through the bed of a turret lathe showing the side carriage with its cross slide and a flexible guard attached thereto; Fig. 2 is an enlarged view showing a portion of the lathe of Fig. 1, but with the slide drawn back so as to illustrate the manner in which the guard will extend over and protect the ways and carriage; Fig. 3 is a view of the same looking toward the left of Fig. 2; and Fig. 4 is a detail sectional view of the guard illustrating the preferred way of making it.

Referring now to the drawings, 10 represents the bed of the lathe, which in this instance, though not necessarily, is a turret lathe the bed having at the top, ways 11 on which the main carriage or saddle which carries the turret is adapted to slide. Likewise one of the upper ways 11 and a lower way 12 accommodates the side carriage 13 provided at the top with ways 14 (see full lines in Fig. 2 and dotted lines in Fig. 3) on which travels a cross slide 15 carrying a tool holder 16 which likewise may be in the form of a turret.

For the purpose of protecting the portions of the carriage 13 and ways 14 thereof which are exposed when the slide is drawn back, say from the position shown in Fig. 1 to the position shown in Fig. 2, and more particularly to prevent chips and cutting compounds from working into the carriage, a guard 17 is attached to the end of the slide 15 so it will move therewith and overlie and constitute a covering for the portions of the carriage 13 and ways 14 which would otherwise be exposed when the cross slide is drawn back. It is of course very important that the guard 17 be so constructed that it will not interfere with the work, and it is therefore made flexible so it will depend from the end of the slide and therefore drop out of the way between the ways 11 of the bed, when the slide is moved inward to substantially the position shown in Fig. 1.

While this flexible guard may be formed of different materials and in different ways, it has been found that a guard produces very good results which is formed of spaced leather strips 17$^a$ connected together by strips of metal 17$^b$ which overlap as shown in the drawings, the metal strips being suitably attached to the leather strips, as by having portions 17$^c$ thereof punched or driven therefrom and forced through the leather strips and bent over or clinched so as to constitute effective fastening means.

In this instance, the guard is attached to the slide by means of an angle 17$^d$ whose upright flange is fastened to the end of the slide, while the horizontal or outwardly projecting flange has attached thereto the ends of the flexible leather strips 17$^a$.

This flexible guard forms a very effective protection for the carriage and its ways, but nevertheless it does not restrict the movements of the cross slide or interfere with the work for the reason that the flexible nature of the guard causes it to hang downward between the ways 11 of the bed, when the inner end of the slide is beyond the inner edge of the carriage.

The leather strips with the overlapping plates not only make the guard effective for the purpose intended, but also protects the parts which the guard overlies from being injured by the dropping of heavy articles.

While the invention is shown as applied to a cross slide of a side carriage, and while mention has been made of the fact that the machine tool here shown is a turret lathe, the invention is not limited to a machine tool of this type, and the guard may be useful in other relations or as attachments for other parts of machine tools which are to be protected in addition to the carriage.

Having described my invention, I claim:

1. In combination in a machine tool having a slide and ways over which the slide is adapted to move, of a flexible guard associated with said slide so as to move therewith comprising a plurality of overlapping metal plates serving to project over the ways when the slide is moved in one direction.

2. The combination with a machine tool having a bed and a side carriage provided with a cross slide, of a flexible guard attached to the slide so as to project down from the end of the slide into the bed when the slide is moved inward, and so as to overlie the inner end of the carriage when the slide is moved outward.

3. In combination with a machine tool having a slide and ways over which the slide is adapted to travel, of a flexible guard attached to the slide so as to overlie the ways when the slide is moved in one direction, said guard being composed of one or more flexible strips and a plurality of overlapping metal plates attached thereto.

4. In combination with a machine tool having a slide and ways over which the slide is adapted to be moved, of a flexible guard attached to the slide so as to overlie the ways when the slide is moved in one direction, said guard comprising a pair of spaced flexible strips and a plurality of overlapping metal plates attached thereto.

In testimony whereof I hereunto affix my signature.

OTTO W. BIRHANZL.